(12) United States Patent
Groshong et al.

(10) Patent No.: US 7,815,212 B2
(45) Date of Patent: Oct. 19, 2010

(54) AIR-OPERATED COUPLING ASSEMBLY

(75) Inventors: Gordon S. Groshong, Oregon City, OR (US); Douglas D. Drader, Rickreall, OR (US)

(73) Assignee: Beall Corporation, Portland, OR (US)

( * ) Notice: Subject to any disclaimer, the term of this patent is extended or adjusted under 35 U.S.C. 154(b) by 352 days.

(21) Appl. No.: 12/113,751

(22) Filed: May 1, 2008

(65) Prior Publication Data

US 2009/0033063 A1 Feb. 5, 2009

Related U.S. Application Data

(60) Provisional application No. 60/927,429, filed on May 3, 2007.

(51) Int. Cl.
*B60D 1/04* (2006.01)
(52) U.S. Cl. .................... 280/514; 280/506; 280/486
(58) Field of Classification Search ............... 280/514, 280/506, 486
See application file for complete search history.

(56) References Cited

U.S. PATENT DOCUMENTS

| | | | | | |
|---|---|---|---|---|---|
| 2,766,995 | A | * | 10/1956 | Weiss | 280/504 |
| 2,842,380 | A | * | 7/1958 | Weiss | 280/504 |
| 3,052,487 | A | * | 9/1962 | Harbers et al. | 280/506 |
| 4,721,324 | A | * | 1/1988 | Blacklaw | 280/504 |
| 5,033,764 | A | * | 7/1991 | Blacklaw | 280/508 |
| 7,431,321 | B2 | * | 10/2008 | Terpsma et al. | 280/514 |
| 2004/0075240 | A1 | * | 4/2004 | Staggs | 280/416.1 |

* cited by examiner

*Primary Examiner*—Lesley Morris
*Assistant Examiner*—Michael R Stabley
(74) *Attorney, Agent, or Firm*—Seed IP Law Group PLLC

(57) ABSTRACT

An adapter for coupling an actuator having an actuator rod that is linearly translatable along a first axis to a coupler having a lever arm with a contact face adapted to contact the draw arm and move the draw arm translationally along a second axis that is at an angle with respect to the first axis in the range of 1 degree to 120 degrees, the coupler mounted to an existing structure, the adapter including a base plate configured for attachment to the structure; a support plate depending from the base plate and adapted to receive the pneumatic actuator; at least one brace attached to the base plate and to the support plate; and a rotatable cam adapted to transfer force from the actuator rod as it moves along the first axis to the lever arm to cause the draw arm to move along the second axis and into contact with the hook on the coupler.

14 Claims, 4 Drawing Sheets

AIR-OPERATED COUPLING ASSEMBLY

BACKGROUND OF THE INVENTION

1. Field of the Invention

The present invention pertains to trailer hitch mechanisms and, more particularly, to an air-operated coupling assembly for releasably attaching a trailer to a truck or to another trailer while preventing relative movement between a drawbar and the coupling.

2. Description of the Related Art

Trailers are attached to heavy-duty trucks and other trailers using a variety of hitch mechanisms. A typical hitch system utilizes a drawbar extending from a trailer having an eye formed thereon that is received over a hook on a hitch. Because fit is not tight, the play between the drawbar and the hitch mechanism allows the drawbar to move rearward and contact the hook when the truck accelerates forward or when the truck stops while moving rearward; and, conversely, the drawbar will move forward and contact the hook when the truck deaccelerates or accelerates rearward.

One method for eliminating the play between the drawbar and the hitch is to push the drawbar into contact with the hitch during operations. FIG. 1 is an exploded view of a known hitch 20 for attachment to a mounting surface 22 on a vehicle (not shown), such as a tractor or trailer. The hitch 20 is fastened to the mounting structure 22 with studs 24 extending from an air chamber 26 and through an adapter bracket 28, then through the mounting structure 22 and into the body 30 of the hitch assembly 20. A thimble 32 is coupled to the air chamber 26 and extends through the adapter bracket 28, the mounting structure 22, and into the hitch body 30.

The hitch 20 includes the aforementioned body 30 having a hook portion 34 extending forward and upward therefrom. A latch 36 is rotatably mounted to the hitch body 30 to move into contact with a top face of the hook 34. A pawl 38 holds the latch 36 in place against the hook portion 34.

A drawbar 40, shown in partial cross section, has an opening or eye 42 formed therein sized and shaped to be slid over the hook portion 34 so that a distal end 44 rests in a space 46 between the hook portion 34 and the hitch body 30.

Referring to the isometric illustration of the hitch 20 in FIG. 2, a shoe 48 is mounted inside the hitch body 30 having a concave face 50 facing towards the hook 34. The shoe 48 is adapted to pivot into contact with the distal end 44 of the drawbar 40 when urged by the thimble 32. The thimble 32 is extended into contact with the shoe 48 by the air chamber 26. Pressurized air acting on a diaphragm in the air chamber forces the thimble 32 to extend away from the air chamber 26 and into engagement with the shoe 48. A spring (not shown) positioned between the shoe 48 and the hitch body 30 urges the shoe away from contact with the drawbar 40 when the air chamber 26 is unpressurized. In other words, the spring pushes the shoe away from the drawbar 40 into contact with the thimble and hence urges the thimble to retract into the unpressurized air chamber 26.

In some applications, the thimble is actuated by an actuator rod 52 (shown in FIG. 1) that is mechanically coupled to the diaphragm in the air chamber 26.

In operation, release of an emergency brake in the tractor causes pressurized air to enter the air chamber 26, thus forcing the actuator rod 52 and the thimble 32 into engagement with the shoe 48. The shoe 48 in turn pivots in the hitch housing 30 into contact with the distal end 44 of the drawbar 40, pushing the drawbar 40 into contact with the hook 34. The pressurized air in the air chamber 26 maintains the shoe 48 in contact with the drawbar 40 to keep the drawbar 40 in constant contact with the hook 34 during operations. This prevents the drawbar 40 from sliding back and forth into contact with the hook portion 34.

In the structure illustrated in FIG. 1, there is a straight linear alignment of the actuator rod 52, thimble 32, and the concave face 50 of the shoe 48. In some installations, there is insufficient room to mount the air chamber 26, and as a result linear alignment of the actuator rod 52 and thimble 32 cannot be obtained. Hence, there is a need for a way to actuate the shoe without having the actuating mechanisms in linear alignment.

BRIEF SUMMARY OF THE INVENTION

The embodiments disclosed herein are directed to the linking of a pneumatic actuator with a coupling mechanism to secure a draw arm to a hook on the coupling mechanism. In accordance with one embodiment of the present disclosure, an adapter is provided for coupling an actuator having an actuator rod that is linearly translatable along a first axis to a coupler having a lever arm with a contact face adapted to contact the draw arm and move the draw arm translationally along a second axis that is at an angle with respect to the first axis in the range of 1 degree to 120 degrees, the coupler mounted to an existing structure, the adapter including a base plate configured for attachment to the structure; a support plate depending from the base plate and adapted to receive the pneumatic actuator; at least one brace attached to the base plate and to the support plate; and a rotatable cam adapted to transfer force from the actuator rod as it moves along the first axis to the lever arm to cause the draw arm to move along the second axis and into contact with the hook on the coupler.

In accordance with another embodiment of the invention, a pneumatic coupling assembly is provided for coupling a draw arm having an eye formed on an end thereof, the coupling assembly including a coupler having a hook adapted to extend through the eye on the draw arm to receive the draw arm, the coupler further including a lever arm adapted to contact the draw arm and urge the draw arm into contact with the hook along a first translational axis; a pneumatic actuator having an actuator rod configured for translational movement along a second axis that is at an angle in the range of 1 degree to 120 degrees with respect to the first translational axis; and a cam assembly mechanically coupling the coupler to the pneumatic actuator, the cam assembly comprising a rotatable cam coupled to the actuator rod and a lever arm rod adapted to contact the cam and the lever arm in the coupler to transmit force from the cam to the lever arm and push the lever arm into contact with the draw arm and thereby urge the draw arm into contact with the hook on the coupler.

BRIEF DESCRIPTION OF THE SEVERAL VIEWS OF THE DRAWING(S)

The foregoing and other features and advantages of the embodiments disclosed herein will be more readily appreciated from the following detailed description when taken in conjunction with the accompanying drawings, wherein.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with hitches and pneumatic actuators, including but not limited to pneumatic controls, pneumatic pumps, and draw arms have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
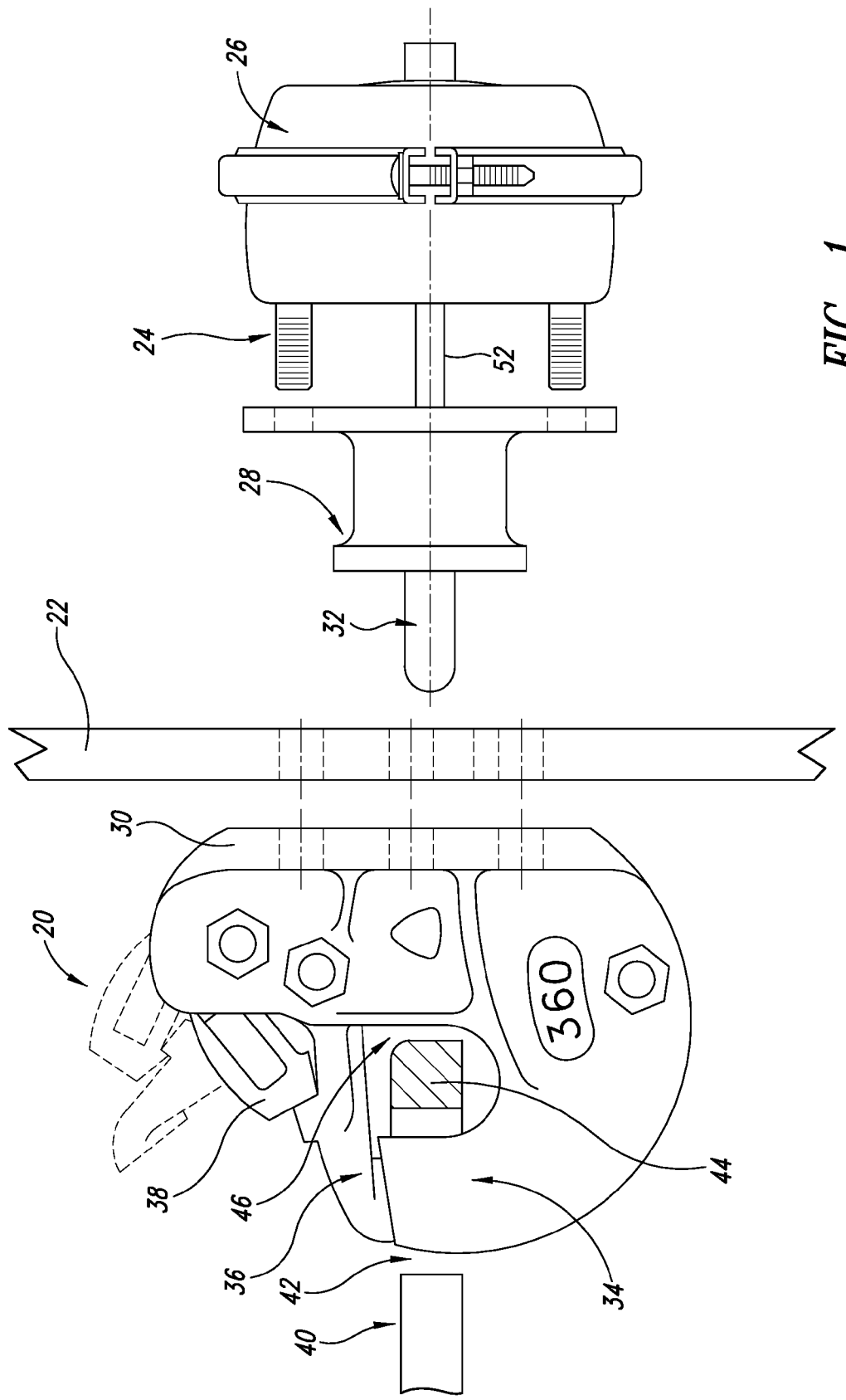
FIG. 1 is a side view illustration of an existing hitch assembly.
Figure 2:
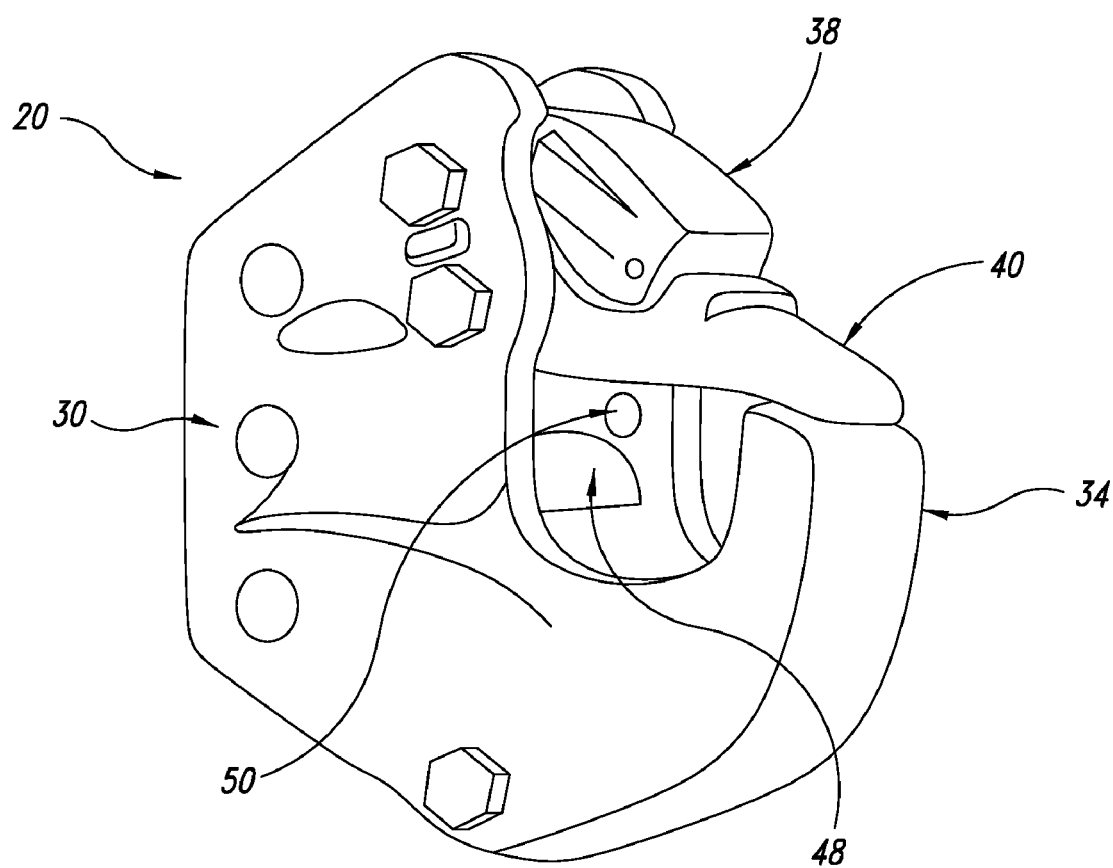
FIG. 2 is an isometric view of an existing hitch.
Figure 3:
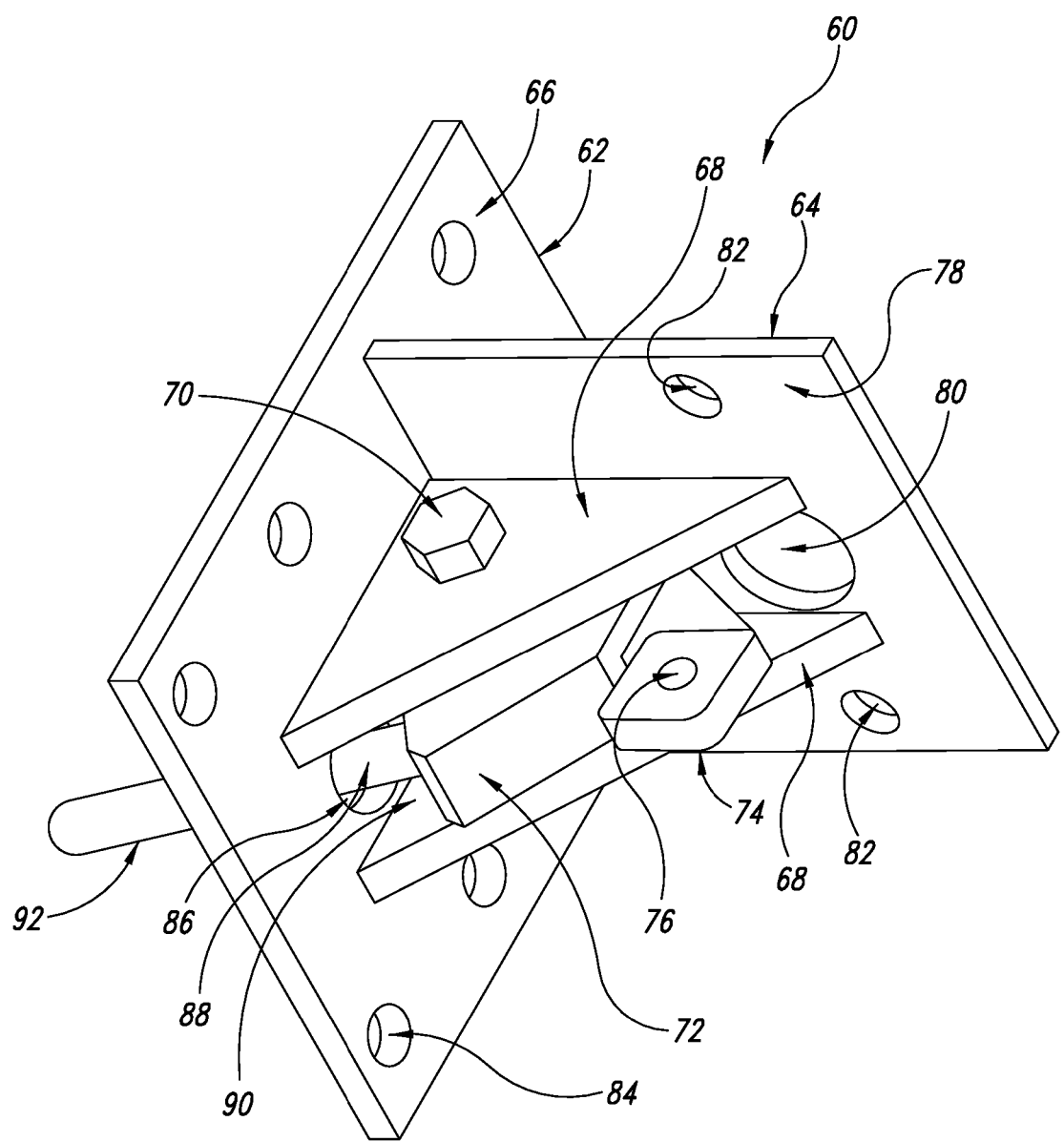
FIG. 3 is an isometric view of an adapter assembly formed in accordance with the present disclosure.

Referring next to FIG. 3, shown therein is an adapter 60 in assembled form to include a base plate 62, a mounting plate 64 depending from a first surface 66 thereof. A pair of braces 68 rigidly hold the support plate on the base plate 62. In addition, the braces 68 support an axle 70, such as a carriage bolt, on which is rotatably mounted a cam 72. A bracket 74 depends from the cam 72 and has an opening 76 to facilitate attachment of an actuator rod, such as the actuator rod 52 shown in FIG. 1. Because the cam 72 is positioned below a lower surface 78 of the support plate 64, an opening 80 is formed in the support plate 64 that is sized and shaped to accommodate an actuator rod for attachment to the cam 72. The support plate 64 includes openings 82 to receive fasteners for attaching a pneumatic actuator on an upper surface of the support plate 64. Similar openings 84 are formed in the base plate for attachment to a support structure, such as a bulk head or mounting bracket on a tractor or a trailer. Another opening 86 is formed in the base plate 62 that is sized and shaped to accommodate a lever arm rod 88 that contacts a cam face 90 for transferring force from the cam 72 through a thimble 92 positioned on an end of the lever arm rod 88 in a conventional manner.

The adapter 60 can be distributed in disassembled form and packaged as a kit, which would include the axle 70, the cam 72, the lever arm rod 88 with thimble 92 as separate components. The base plate 62, support plate 64, and braces 68 can be integrally formed as a single unit or attached together by conventional means. For example, the base plate 62, support plate 64, and braces 68 can be formed of metal or metal alloys that are welded together, attached together by fasteners, or held together using a tongue and groove configuration or other known configurations and means for securing these elements together.

While the base plate 62 is shown orthogonal to the support plate 64, it is to be understood that the support plate 64 can depend from the base plate 62 at angles other than 90 degrees, and preferably at angles in the range of 1 degree to 120 degrees. In one embodiment, the braces 68 can be configured to enable changes in the angular orientation of the support plate 64 with the base plate 62 wherein each brace 68 would be formed of two pieces coupled together with fasteners that allow the relative orientation of the two pieces to be changed, thus allowing the support plate 64 to angle away from or towards the base plate 62. This may require relocation of the axle 70 so that the cam 72 can rotate a sufficient distance without contacting the base plate 62.

Figure 4:
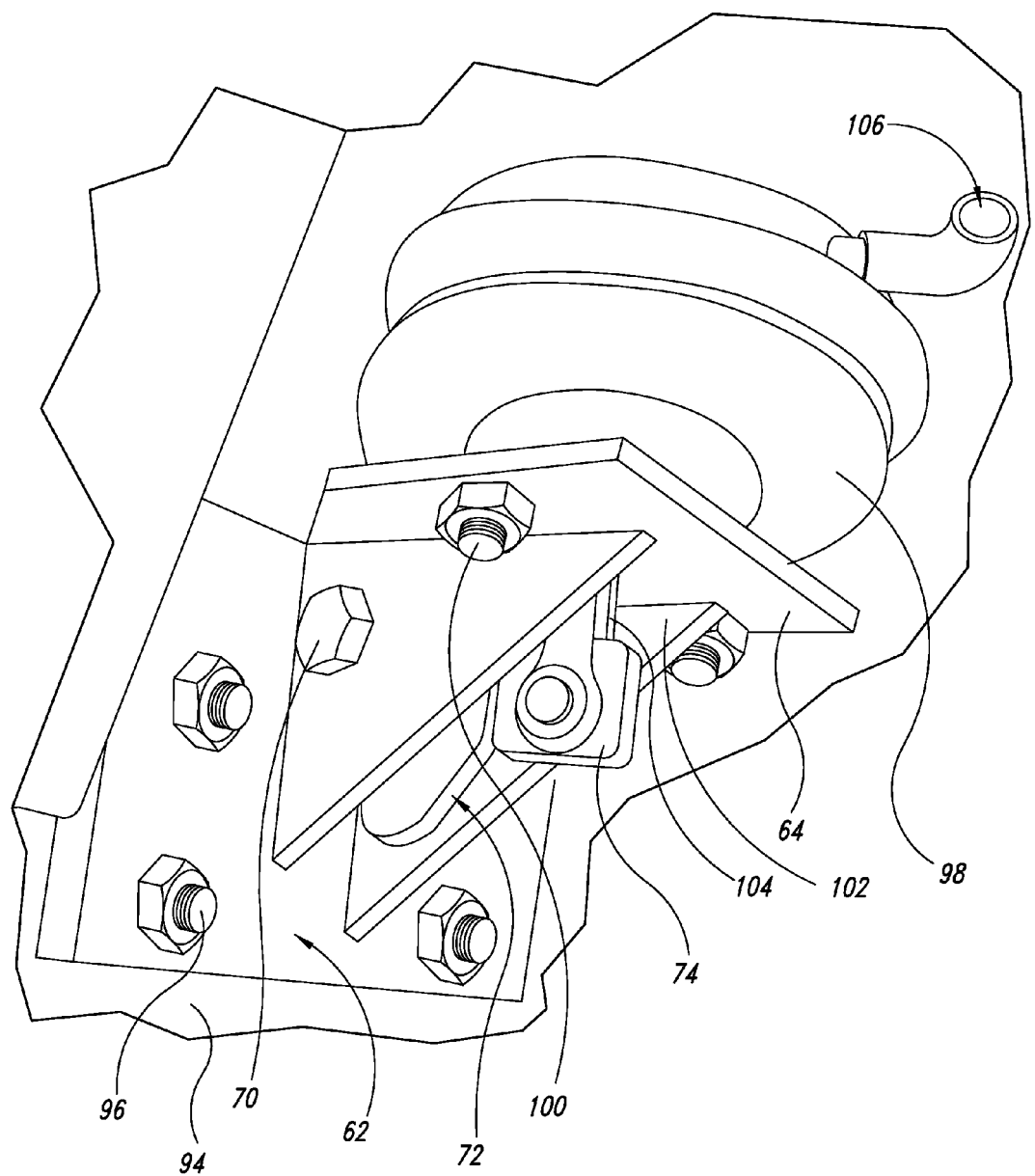
FIG. 4 is an isometric view of the adapter assembly of FIG. 3 in conjunction with a pneumatic coupling assembly.

Shown in FIG. 4 is one implementation of the adaptor 60. Here, the mounting plate 62 is secured to a support structure 94 with fasteners 96 in a conventional manner. A pneumatic actuator 98 is bolted to the support plate 64 using bolts 100. A yoke 102 is attached to the bracket 74 and an actuator rod 104 is attached to the yoke 102 on one end and to a diaphragm (not shown) in the pneumatic actuator 98. A pneumatic fitting 106 is used for coupling the pneumatic actuator 98 to a source of pressurized air.

As can be seen in FIGS. 3 and 4, the actuator rod 104 is adapted for translational movement about a first axis that is coincidental with the longitudinal axis of the actuator rod 104. The lever arm rod 88 is adapted for translational movement about a second axis that is coincidental with the longitudinal axis of the lever arm rod 88. The angle between the first axis of the actuator rod 104 and the second axis of the lever arm rod 88 ranges from 1 degree to 120 degrees. In most applications, the angle will more likely be in the range of 80 degrees to 110 degrees, with a preferred embodiment having the angle at approximately 90 degrees. Thus, translational movement of the actuator rod 104 forces the cam 72 to rotate clockwise around the axle 70, which pushes the lever arm rod 88 through the base plate 62 and into contact with a lever arm in the coupler, such as the shoe shown in the hitch mechanism 20 of FIG. 1. The shoe then contacts the distal end 44 of the draw arm and pushes it into contact with the hook portion 34 of the hitch mechanism 20 and holds it in place as long as pressurized air is introduced into the pneumatic actuator 98. As described above, the pressurized air is constantly introduced into the pneumatic actuator 98 so long as the emergency brake is off. In other words, at all times during operation of the tractor, for example, when the emergency brake is off, the shoe 48 continuously urges the draw arm 40 into contact with the hook portion 34.

By utilizing this elbow cam arrangement of the present disclosure, the pneumatic actuator can be oriented at any position in addition to the standard linear alignment of the actuator rod 102 with the lever arm rod 88 and thimble 92.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An adapter is provided for coupling an actuator having an actuator rod that is linearly translatable along a first axis to a coupler having a lever arm with a contact face adapted to contact a draw arm and move the draw arm translationally along a second axis that is at an angle with respect to the first axis in the range of 1 degree to 120 degrees, the coupler mounted to an existing structure, the adapter comprising:
- a base plate configured for attachment to the existing structure;
- a support plate depending from the base plate and adapted to receive the pneumatic actuator;
- at least one brace attached to the base plate and to the support plate; and
- a rotatable cam adapted to transfer force from the actuator rod as it moves along the first axis to the lever arm and move the draw arm along the second axis.

2. The adapter of claim 1, wherein the rotatable cam is mounted to an axle supported by the at least one brace.

3. The adapter of claim 2, wherein the at least one brace comprises a pair of braces attached to the base plate and to the support plate and having the axle mounted to the pair of braces for supporting the rotatable cam.

4. The adapter of claim 1, wherein the cam comprises an arm extending therefrom and configured for attachment to the actuator rod.

5. The adapter of claim 4, wherein the support plate comprises an opening sized and shaped to allow the actuator rod to pass therethrough.

6. The adapter of claim 1, further comprising a lever arm rod adapted to contact the rotatable cam and transfer force from the rotatable cam to the lever arm mounted on the coupler.

7. The adapter of claim 6, wherein the base plate comprises an opening sized and shaped to allow the lever arm rod to pass therethrough.

8. The adapter of claim 1, wherein the at least one brace is adapted to enable selective positioning of the support plate relative to the base plate about an angle between the base plate and the support plate in the range of 1 degree to 120 degrees.

9. The adapter of claim 1, wherein the lever arm rod comprises a thimble positioned at one end of the lever arm rod for contacting the lever arm.

10. A pneumatic coupling assembly for coupling to a draw arm having an eye formed thereon, the assembly comprising:
- a coupler having a hook adapted to extend through the eye on the draw arm to receive the draw arm, the coupler further comprising a lever arm adapted to contact the draw arm and urge the draw arm into contact with the hook along a first translational axis;
- a pneumatic actuator having an actuator rod configured for translational movement along a second axis that is at an angle in the range of 1 degree to 120 degrees with respect to the first translational axis; and
- a cam assembly mechanically coupling the coupler to the pneumatic actuator, the cam assembly comprising a rotatable cam coupled to the actuator rod and a lever arm rod adapted to contact the cam and the lever arm in the coupler to transmit force from the cam to the lever arm and push the lever arm into contact with the draw arm and thereby urge the draw arm into contact with the hook on the coupler.

11. The assembly of claim 10, wherein the cam assembly comprises a base plate, a support plate depending from the base plate, and at least one brace attached to the base plate and the support plate, the at least one brace supporting an axle upon which the cam is rotatably mounted.

12. The assembly of claim 11, wherein the cam comprises a mounting bracket to which the actuator rod is attached.

13. The assembly of claim 11, wherein the at least one brace comprises a pair of braces having the axle mounted thereon for supporting the rotatable cam.

14. The assembly of claim 12, wherein the pair of braces are configured to permit adjustment in the position of the support plate relative to the base plate at an angle between 1 degree and 120 degrees.

\* \* \* \* \*